(12) United States Patent
Kato

(10) Patent No.: US 9,866,040 B2
(45) Date of Patent: Jan. 9, 2018

(54) POWER TRANSMISSION DEVICE AND WIRELESS POWER TRANSMISSION SYSTEM

(71) Applicant: Murata Manufacturing Co., Ltd., Nagaokakyo-shi, Kyoto-fu (JP)

(72) Inventor: Kazuya Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 188 days.

(21) Appl. No.: 14/944,633

(22) Filed: Nov. 18, 2015

(65) Prior Publication Data

US 2016/0072311 A1  Mar. 10, 2016

Related U.S. Application Data

(63) Continuation of application No. PCT/JP2014/073448, filed on Sep. 5, 2014.

(30) Foreign Application Priority Data

Sep. 12, 2013 (JP) ................................ 2013-189009

(51) Int. Cl.
   *H02J 7/02* (2016.01)
   *H02J 5/00* (2016.01)
   (Continued)

(52) U.S. Cl.
   CPC ............ *H02J 5/005* (2013.01); *H02J 7/00* (2013.01); *H02J 7/025* (2013.01); *H02J 17/00* (2013.01)

(58) Field of Classification Search
   CPC ...................... H02J 50/00; H02J 50/05
   See application file for complete search history.

(56) References Cited

U.S. PATENT DOCUMENTS 6,844,702 B2 * 1/2005 Giannopoulos ......... H02J 7/025
                                                320/108
7,979,754 B2 * 7/2011 Drost ............... G01R 31/31922
                                                 29/834
(Continued)

FOREIGN PATENT DOCUMENTS

| JP | 2010-183705 A | 8/2010 |
| WO | WO 2012/070479 A1 | 5/2012 |
| WO | WO 2013/077086 A1 | 4/2015 |

OTHER PUBLICATIONS

International Search Report issue for PCT/JP2014/073448, dated Nov. 11, 2014.
(Continued)

*Primary Examiner* — Jeffrey Zweizig
(74) *Attorney, Agent, or Firm* — Arent Fox LLP

(57) ABSTRACT

A power transmission device applies a alternating-current voltage to an active electrode OPPOSING an active electrode of a power reception device with a gap therebetween, and to a passive electrode OPPOSING a passive electrode of the power reception device with a gap therebetween and transmits power via electric field coupling. The power transmission device includes a controller that monitors a voltage applied to the passive electrode. If a change in the voltage per unit time exceeds a threshold, the controller determines that a metal foreign object has become interposed between the active electrodes and a user has touched the metal foreign object, and stops the transmission of power to the power reception device. Thus, a power transmission device and a wireless power transmission system are provided that are capable of preventing with certainty a malfunction due to a foreign object when a foreign object has become interposed between electrodes.

14 Claims, 5 Drawing Sheets

(51) Int. Cl.
*H02J 7/00* (2006.01)
*H02J 17/00* (2006.01)

(56) References Cited

U.S. PATENT DOCUMENTS

| | | |
|---|---|---|
| 2013/0187479 A1 | 7/2013 | Tsuchiya et al. |
| 2014/0253052 A1 | 9/2014 | Goma et al. |

OTHER PUBLICATIONS

Written Opinion of the International Searching Authority issued for PCT/JP2014/073448, dated Nov. 11, 2014.

* cited by examiner

POWER TRANSMISSION DEVICE AND WIRELESS POWER TRANSMISSION SYSTEM

CROSS-REFERENCE TO RELATED APPLICATIONS

The present application is a continuation of PCT/JP2014/073448 filed Sep. 5, 2014, which claims priority to Japanese Patent Application No. 2013-189009, filed Sep. 12, 2013, the entire contents of each of which are incorporated herein by reference.

FIELD OF THE INVENTION

The present invention relates to a power transmission device that wirelessly transmits power to a power reception device using an electric field coupling scheme and relates to a wireless power transmission system.

BACKGROUND OF THE INVENTION

Among systems in which power is wirelessly transmitted from a power transmission device to a power reception device, there is a system that uses an electric field coupling scheme. In this system, electrodes of the power transmission device and electrodes of the power reception device are electric field coupled with each other and power is transmitted therebetween. In addition, in this electric field coupling scheme, if the amount of power being transmitted is comparatively large and a foreign object is interposed between the electrodes, a malfunction may occur. Accordingly, a wireless power transmission system capable of detecting that a foreign object has come close to an electrode is proposed in Patent Document 1.

In the wireless power transmission system described in Patent Document 1, a foreign object detection electrode is provided in the power transmission device so as to be spaced apart from an electrode used for electric field coupling. A voltage generated between the electric field coupling electrode and the foreign object detection electrode is monitored and when this voltage changes by a certain amount or more, it is determined that a foreign object has come close to the space between the electric field coupling electrodes of the power transmission device and the power reception device and power transmission is stopped.

Patent Document 1: International Publication No. 2012/070479.

However, there is a problem in the case described in Patent Document 1 in that a foreign object detection electrode needs to be provided and additionally the foreign object detection electrode needs to be provided so as to surround an electric field coupling electrode and furthermore the shapes of the electrodes used in the power transmission device are restricted. In addition, there is also a problem in that, if the foreign object detection electrode has a shape containing a cut-out portion, it will not be possible to detect a foreign object when a foreign object approaches the cut-out portion. Consequently, in Patent Document 1, it may not be possible to accurately detect a foreign object and there is a risk of a malfunction occurring due to it not being possible to detect a foreign object with certainty and a user touching the foreign object.

SUMMARY OF THE INVENTION

Accordingly, an object of the present invention is to provide a power transmission device and a wireless power transmission system capable of preventing with certainty a malfunction due to a foreign object when a foreign object has become interposed between electrodes.

A power transmission device of the present invention is provided that applies an alternating-current voltage to a first power-transmission-side electrode, which opposes a first power-reception-side electrode of a power reception device with a gap therebetween, and to a second power-transmission-side electrode, which opposes a second power-reception-side electrode of the power reception device with a gap therebetween and has a surface area equal to or greater than a surface area of the first power-transmission-side electrode, and transmits power to the power reception device via electric field coupling, the power transmission device including a voltage monitoring unit that monitors a voltage of the second power-transmission-side electrode, and a power transmission stopping unit that stops transmission of power to the power reception device in a case where an absolute value of a change per regular interval in the voltage monitored by the voltage monitoring unit exceeds a predetermined threshold.

The potential of the second power-transmission-side electrode changes when a metal foreign object becomes interposed between the first power-reception-side electrode and the first power-transmission-side electrode and a person touches the metal foreign object. Consequently, a malfunction caused by a person touching a metal foreign object interposed between the electrodes can be prevented by monitoring the voltage applied to the second power-transmission-side electrode and stopping the transmission of power on the basis of changes in the voltage with time.

According to the present invention, a malfunction caused by a person touching a metal foreign object interposed between electrodes can be prevented.

DETAILED DESCRIPTION OF THE EXEMPLARY EMBODIMENTS

Figure 1:
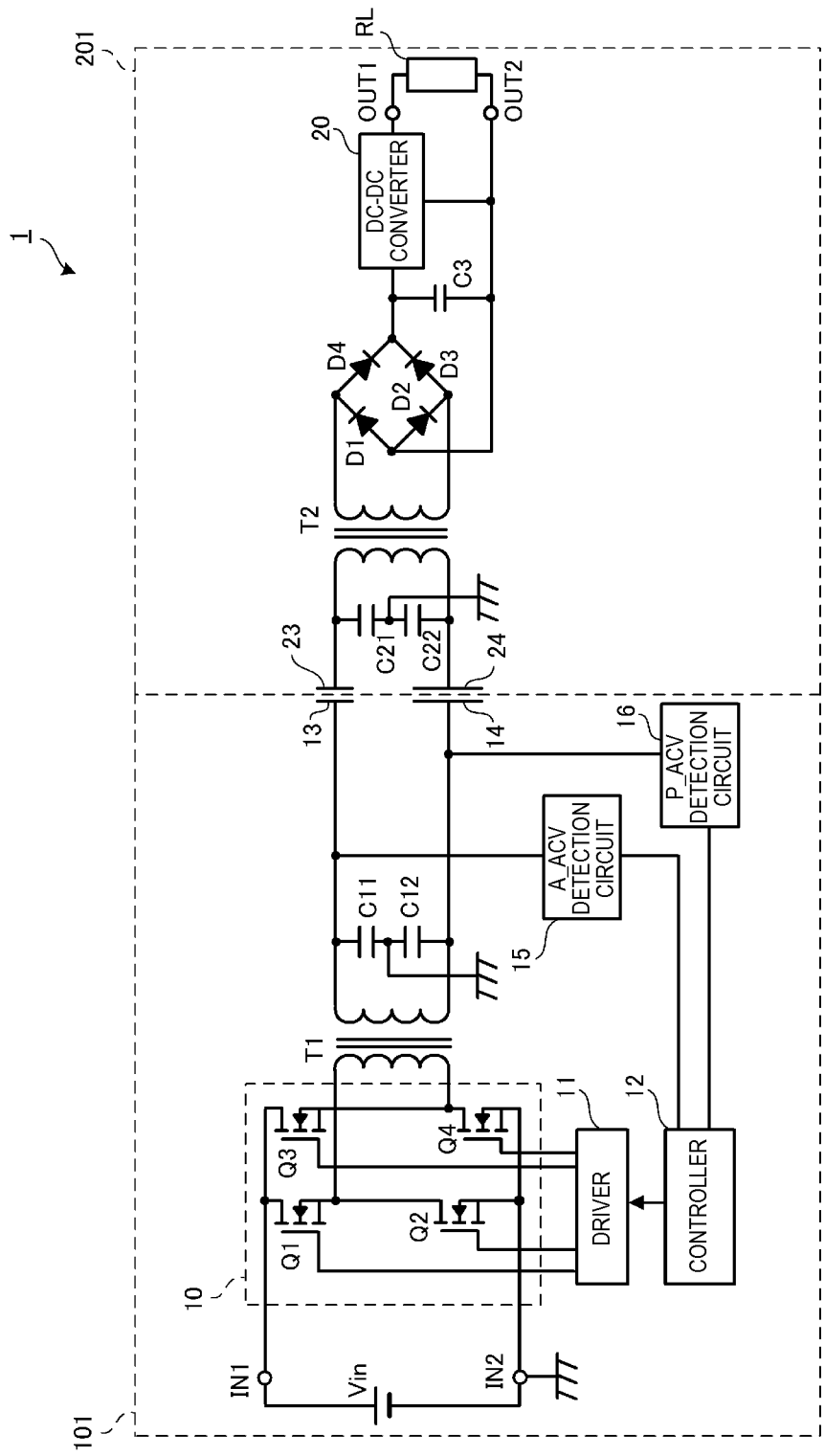
FIG. 1 is a circuit diagram of a wireless power transmission system according to an embodiment.

FIG. 1 is a circuit diagram of a wireless power transmission system 1 according to an embodiment. The wireless power transmission system 1 according to this embodiment is formed of a power transmission device 101 and a power reception device 201. The power reception device 201 includes a load circuit RL. The load circuit RL includes a rechargeable battery and a charging circuit. The power reception device 201 is for example a mobile electronic appliance. Examples of such a mobile electronic appliance include cellular phones, personal digital assistants (PDAs), portable music players, laptop PCs, digital cameras and so forth. The power reception device 201 is mounted on the power transmission device 101. The power transmission device 101 charges the rechargeable battery of the power reception device 201 mounted thereon.

In FIG. 1, the load circuit RL is provided inside the power reception device 201, but the load circuit RL may for example be provided outside of the power reception device 201 or may be a circuit that can be attached to and detached from the power reception device 201.

A direct-current voltage Vin is connected to input terminals IN1 and IN2 of the power transmission device 101. The direct-current voltage Vin is a direct-current voltage obtained by conversion performed by an AC adapter. The power transmission device 101 operates with this direct-current voltage Vin. The AC adapter is connected to a commercial power supply and converts an AC voltage of 100 V to 230 V to a DC voltage of 19 V. However, it is not necessary that the voltage be converted to a DC voltage of 19 V and the voltage may instead be converted to a DC voltage of 5 V or 12 V for example.

A DC-AC inverter circuit 10, which is composed of switch elements Q1, Q2, Q3 and Q4, is connected between the input terminals IN1 and IN2 of the power transmission device 101. This DC-AC inverter circuit 10 corresponds to a direct-current alternating-current conversion circuit of the present invention. The switch elements Q1, Q2, Q3 and Q4 are n-type MOS-FETs. The switch elements Q1 and Q2 are connected in series with each other and the switch elements Q3 and Q4 are connected in series with each other. In addition, a primary coil of a step-up transformer T1 is connected to a connection point between the switch elements Q1 and Q2 and a connection point between the switch elements Q3 and Q4. The step-up transformer T1 steps up an alternating-current voltage obtained by converting the direct-current voltage Vin.

The switch elements Q1, Q2, Q3 and Q4 are subjected to PWM control by a driver 11. The driver 11 alternately turns the switch elements Q1 and Q4 and the switch elements Q2 and Q3 on and off in accordance with a control signal from a controller 12. As a result of the switch elements Q1 and Q4 and the switch elements Q2 and Q3 being alternately turned on and off, the DC-AC inverter circuit 10 converts the direct-current voltage Vin into an alternating-current voltage.

An active electrode 13 and a passive electrode 14 are connected to a secondary coil of the step-up transformer T1. The active electrode 13 is a first power-transmission-side electrode of the present invention and the passive electrode 14 is a second power-transmission-side electrode of the present invention. The active electrode 13 and the passive electrode 14 are both shaped like a flat plate and the passive electrode 14 has a larger surface area than the active electrode 13. It is sufficient that the surface area of the passive electrode 14 be at least the same as the surface area of the active electrode 13 and may be equal to or greater than the surface area of the active electrode 13. The surface area of the active electrode 13 is smaller than that of the passive electrode 14. The alternating-current voltage stepped up by the step-up transformer T1 is applied to the active electrode 13 and the passive electrode 14.

Capacitors C11 and C12 are connected in parallel with the secondary coil of the step-up transformer T1, and the capacitors C11 and C12 form a parallel resonance circuit together with the inductance of the step-up transformer T1. In addition, the capacitors C11 and C12 form a series resonance circuit together with a leakage inductance of the secondary coil of the step-up transformer T1 or together with an inductor that is an actual component.

An A_ACV detection circuit 15, which detects a voltage A_ACV of the active electrode 13, is connected to the active electrode 13. In addition, a P_ACV detection circuit 16, which detects a voltage P_ACV of the passive electrode 14, is connected to the passive electrode 14. The A_ACV detection circuit 15 and the P_ACV detection circuit 16 have the same circuit configuration as each other. The voltage A_ACV of the active electrode 13 has the magnitude of a potential difference between the potential of the active electrode 13 and a reference potential and the voltage P_ACV of the passive electrode 14 has the magnitude of a potential difference between the potential of the active electrode 13 and the reference potential.

Figure 2:
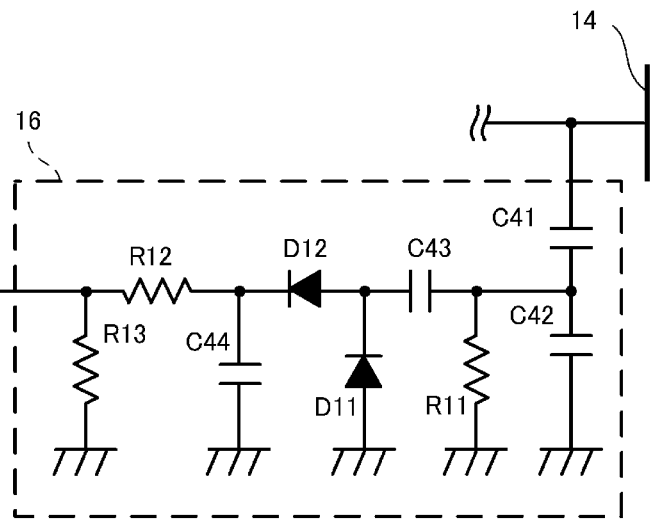
FIG. 2 illustrates a circuit of a P_ACV detection circuit.

FIG. 2 illustrates a circuit of the P_ACV detection circuit 16. The A_ACV detection circuit 15 has the same circuit configuration as the P_ACV detection circuit 16 and therefore description thereof will be omitted.

In the P_ACV detection circuit 16, a voltage divider circuit composed of capacitors C41 and C42 is connected to a connection line connected to the passive electrode 14. A resistor R11 is connected to a connection point between the capacitors C41 and C42 and is grounded at one end. The resistor R11 is an element for consuming a low-frequency component. In addition, rectification diodes D11 and D12 and a capacitor C44 are connected to a connection point between the capacitors C41 and C42 via a DC cut capacitor C43. Furthermore, voltage control resistors R12 and R13 are connected to each other and to the controller 12.

The controller 12 controls the driver 11 and causes the switch elements Q1 and Q4 and the switch elements Q2 and Q3 to be alternately turned on and off such that the voltage A_ACV regularly detected by the A_ACV detection circuit 15 is maintained at a certain voltage.

In addition, the controller 12 monitors changes over time in the voltage P_ACV regularly detected by the P_ACV detection circuit 16 and performs power transmission stoppage determination processing. Stoppage determination processing is processing in which it is determined whether or not to stop power transmission in order to prevent a user from receiving an electric shock when a metal foreign object has become interposed between the active electrode 13 and an opposing active electrode 23 of the power reception device 201 and the user touches the metal foreign object. The stoppage determination processing performed by the controller 12 will be described in detail below.

The power reception device 201 includes the active electrode 23 and a passive electrode 24. The active electrode 23 is a first power-reception-side electrode of the present invention and the passive electrode 24 is a second power-reception-side electrode of the present invention. The passive electrode 24 has a larger surface area than the active electrode 23. It is sufficient that the surface area of the passive electrode 24 be at least the same as the surface area of the active electrode 23 and may be equal to or greater than the surface area of the active electrode 23. The active electrode 23 and the passive electrode 24 respectively have substantially the same surface areas as the active electrode 13 and the passive electrode 14 and respectively face the active electrode 13 and the passive electrode 14 of the power transmission device 101 with gaps therebetween when the power reception device 201 is mounted on the power transmission device 101. An alternating-current voltage is applied between the active electrode 13 and the passive electrode 14 and as a result an electric field is generated between the active electrodes 13 and 23 and between the passive electrodes 14 and 24, which are arranged so as to respectively face each other, and power is transmitted from the power transmission device 101 to the power reception device 201 via the electric fields.

A primary coil of a step-down transformer T2 is connected to the active electrode 23 and the passive electrode 24 of the power reception device 201. A series circuit composed of capacitors C21 and C22 is connected in parallel with the primary coil. The capacitors C21 and C22 form a parallel resonance circuit together with the inductance of the step-down transformer T2. The resonant frequency of the parallel resonance circuit is set to substantially the same resonant frequency as the series resonance circuit of the power transmission device 101 in order to realize efficient transmission of power.

A diode bridge, which is composed of diodes D1, D2, D3 and D4, is connected to the secondary coil of the step-down transformer T2. One output of the diode bridge is connected to an output terminal OUT1 via a smoothing capacitor C3 and a DC-DC converter 20. The other output of the diode bridge is connected to an output terminal OUT2. The load circuit RL, which includes the rechargeable battery, the charging circuit and another load circuit, is connected to the output terminals OUT1 and OUT2. The diode bridge and the smoothing capacitor C3 correspond to a rectification-smoothing circuit of the present invention and rectify and smooth an alternating-current voltage stepped down by the step-down transformer T2. The rectified and smoothed direct-current voltage is converted into a stabilized predetermined voltage by the DC-DC converter 20.

Thus, in the wireless power transmission system 1, the controller 12 of the power transmission device 101 performs stoppage determination processing in which the voltage P_ACV is monitored and it is determined whether or not to stop transmission of power on the basis of changes over time in the voltage P_ACV. By performing the stoppage determination processing, the user can be prevented from experiencing an electric shock even if the user touches a metal foreign object interposed between the active electrodes 13 and 23. Hereafter, the stoppage determination processing will be described in detail.

Figure 3:
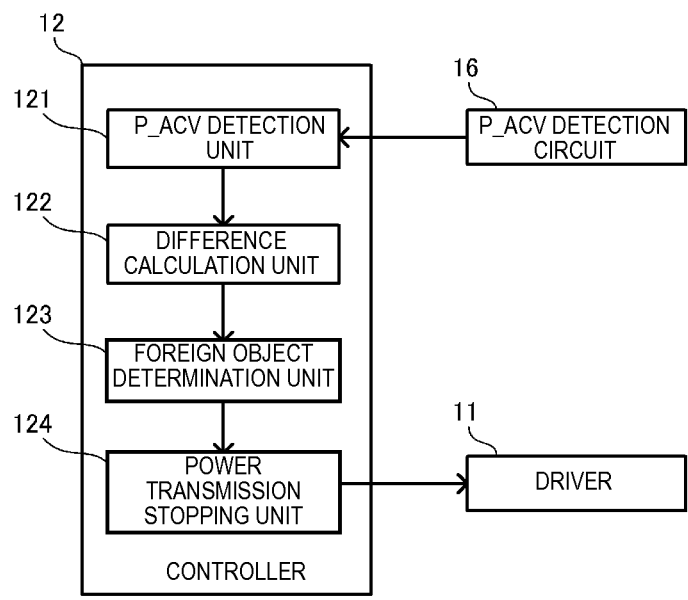
FIG. 3 is a block diagram illustrating the configuration of a controller.

FIG. 3 is a block diagram illustrating the configuration of the controller 12. The controller 12 is a microcomputer and by executing a program realizes the functions of a P_ACV detection unit 121, a difference calculation unit 122, a foreign object determination unit 123 and a power transmission stopping unit 124. Although not shown, it should be appreciated that the microcontroller can include electronic memory as would be understood to one skilled in the art, where the electronic memory can store a predetermined voltage threshold (for example, 15 V).

The P_ACV detection unit 121 detects the voltage P_ACV at regular intervals ($\Delta t$) by using the P_ACV detection circuit 16. The P_ACV detection unit 121 corresponds to a voltage monitoring unit of the present invention. The regular intervals ($\Delta t$) can be predetermined time intervals as would be understood to one skilled in the art in which the voltage P_ACV is measured at a timing t after each interval ($\Delta t$).

The difference calculation unit 122 calculates a difference in the voltage P_ACV, which changes over time. In more detail, the difference calculation unit 122 calculates a difference $\Delta$P_ACV between a voltage P_ACV detected by the P_ACV detection unit 121 at a timing t and a voltage P_ACV detected by the P_ACV detection unit 121 at a timing t+$\Delta t$.

The foreign object determination unit 123 determines whether an absolute value |$\Delta$P_ACV| of the difference $\Delta$P_ACV calculated by the difference calculation unit 122 exceeds a threshold. In the case where the absolute value |$\Delta$P_ACV| does exceed the threshold, it is determined that a metal foreign object has become interposed between the active electrodes 13 and 23 and a user has touched the metal foreign object.

In the case where it has been determined by the foreign object determination unit 123 that a user has touched a metal foreign object interposed between the active electrodes 13 and 23, the power transmission stopping unit 124 controls the driver 11 in order to stop driving the DC-AC inverter circuit 10 and, therefore, stop transmission of power to the power reception device 201. For example, the transmission of power may be stopped by turning the switch elements Q1 to Q4 off, or a switch element may be provided along a power supply line connected to the input terminal IN1 and the supply of power to the DC-AC inverter circuit 10 from the direct-current voltage Vin may be interrupted by turning this switch element off.

Thus, the controller 12 monitors the voltage P_ACV and determines whether to stop the transmission of power on the basis of changes over time in the voltage P_ACV. Hereafter, the reason why the controller 12 monitors the voltage P_ACV rather than the voltage A_ACV and determines that a user has touched a metal foreign object when the change in the voltage P_ACV in each time interval ($\Delta t$) exceeds a threshold will be explained.

Figure 4:
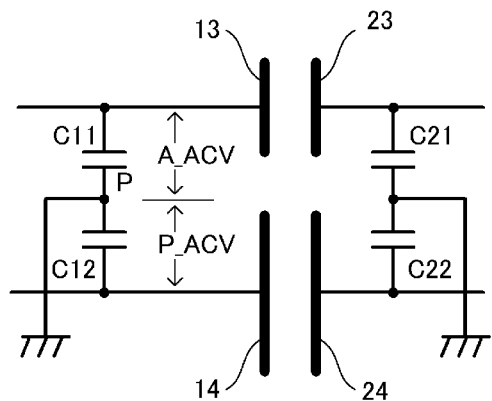
FIG. 4 is a diagram for explaining an equivalent circuit for a case when a user touches a metal foreign object interposed between active electrodes.
Figure 4:
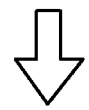
Figure 4:
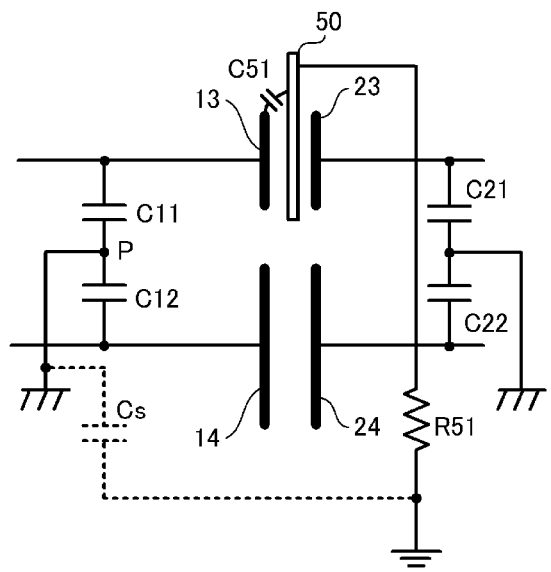

FIG. 4 is a diagram for explaining an equivalent circuit for a case when a user touches a metal foreign object interposed between the active electrodes 13 and 23.

The upper part of FIG. 4 illustrates a circuit of part of the wireless power transmission system 1 at a normal time. A connection point P between the capacitors C11 and C12 is at a reference potential and the capacitors C11 and C12 form a voltage divider circuit connected between the active electrode 13 and the passive electrode 14. In order to make the potential of the connection point P between the capacitors C11 and C12, which is the reference potential of the power transmission device 101, and the potential of the connection point between the capacitors C21 and C22, which is the reference potential of the power reception device 201, equal to each other and stable, a capacitance ratio between the capacitors C11 and C12 and a capacitance ratio between the capacitors C21 and C22 is made to be the same as a capacitance ratio between a capacitance formed by the active electrodes 13 and 23 and a capacitance formed by the passive electrodes 14 and 24. A charging voltage of the capacitor C11 corresponds to the voltage A_ACV and a charging voltage of the capacitor C12 corresponds to the voltage P_ACV. In this embodiment, the passive electrodes 14 and 24 have larger surface areas and larger capacitances than the active electrodes 13 and 23.

The bottom part of FIG. 4 illustrates a circuit for the case where a metal foreign object (for example, a paper clip) 50 has become interposed between the active electrodes 13 and 23 and a user has touched the metal foreign object 50. Due to the metal foreign object 50 being interposed between the active electrodes 13 and 23, a capacitance C51 is generated between the active electrode 13 and the metal foreign object 50. In addition, the metal foreign object 50 is grounded to the earth via a resistance component R51 generated by the human body (user) touching the metal foreign object 50.

Furthermore, this circuit can be treated as a circuit in which the connection point P connected to the reference potential of the power transmission device 101 is grounded to the earth via a stray capacitance Cs. In this case, when a user touches the metal foreign object 50, the connection point P, that is, the reference potential, is shifted to the potential of the earth. Therefore, a change in the division ratio between the active electrode 13 and the passive electrode 14 and a shift in the reference potential are generated due to the capacitance C51, the resistance R51 and the stray capacitance Cs, and consequently the effect of the shift in the reference potential appears in the detection results when the voltage A_ACV and the voltage P_ACV are detected.

Figure 5:
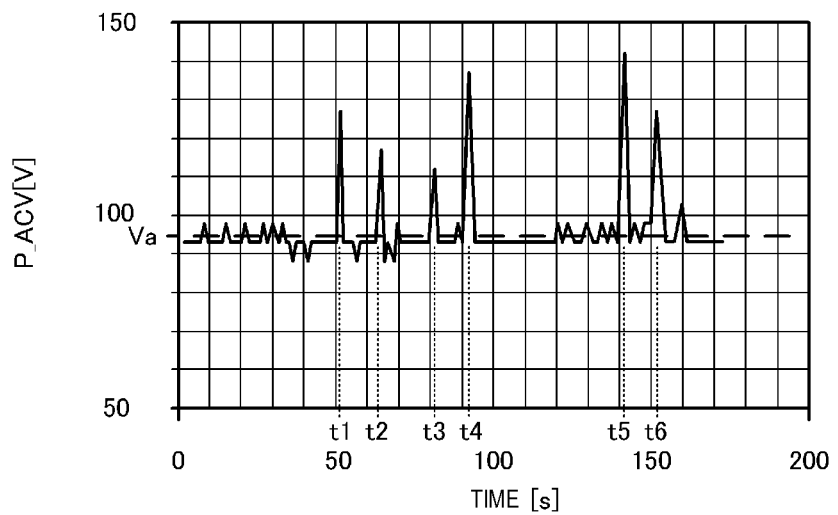
FIG. 5 illustrates detection results for a voltage P_ACV sampled at discrete times.
Figure 6:
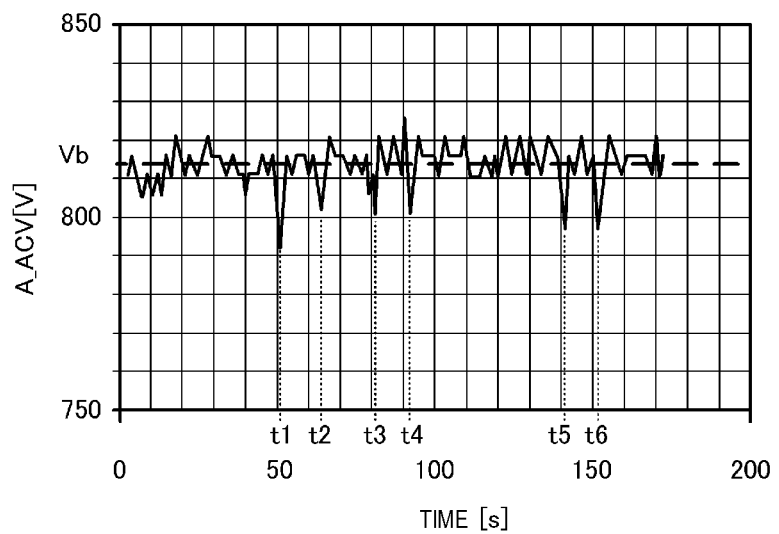
FIG. 6 illustrates detection results for a voltage A_ACV sampled at discrete times.

FIG. 5 illustrates detection results for the voltage P_ACV sampled at discrete times. FIG. 6 illustrates detection results for the voltage A_ACV sampled at discrete times. Timings t1, t2, t3, t4, t5 and t6 illustrated in FIGS. 5 and 6 are timings at which the metal foreign object 50 interposed between the electrodes is touched by a user. The voltage A_ACV and the voltage P_ACV change at these timings.

As described above, the capacitor C12 has a larger capacitance than the capacitor C11. Therefore, even though the reference potential is shifted, the effect of this shift is smaller than in the case of the capacitor C11. Specifically, comparing FIG. 5 and FIG. 6, it can be seen that the fluctuations in the voltage P_ACV with respect to a normal operation voltage Va illustrated in FIG. 5 are smaller than the fluctuations in the voltage A_ACV with respect to a normal operation voltage Vb. In other words, the voltage P_ACV is more stable and less affected by shifting of the reference potential than the voltage A_ACV. Consequently, the controller 12 is able to perform more precise stoppage determination processing with respect to changes in voltage caused by a user touching the metal foreign object 50 interposed between the electrodes by monitoring the voltage P_ACV rather than the voltage A_ACV.

Figure 7:
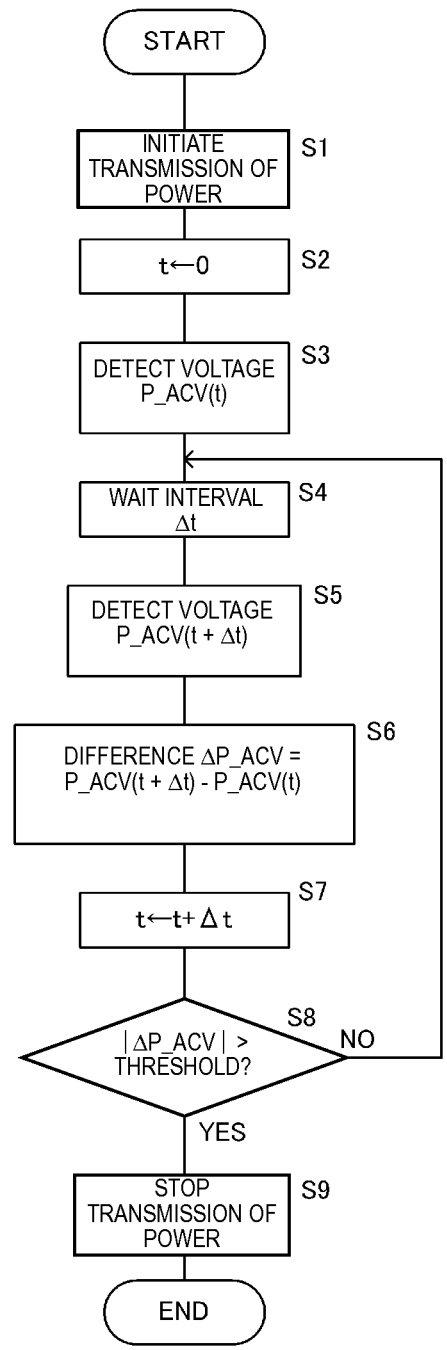
FIG. 7 is a flowchart of stoppage determination processing executed by a controller.

FIG. 7 is a flowchart of stoppage determination processing executed by the controller 12.

The controller 12 controls the driver 11 to initiate transmission of power (S1). Next, the controller 12 resets a timer (t=0) (S2) and detects a voltage P_ACV(t) at a timing t (S3). After waiting an interval Δt (S4), the controller 12 detects a voltage P_ACV(t+Δt) at a timing t+Δt (S5). The controller 12 calculates a difference ΔP_ACV between the detected voltage P_ACV(t) and the detected voltage P_ACV(t+Δt) (S6).

The controller 12 sets the timing t+Δt as a new timing t (S7) and determines whether an absolute value |ΔP_ACV| of the difference ΔP_ACV exceeds a threshold (for example, 15 V) (S8). In the case where the difference ΔP_ACV does exceed the threshold (S8: YES), the controller 12 determines that the metal foreign object 50 is interposed between the active electrodes 13 and 23 and a user is touching the metal foreign object 50 and stops transmission of power (S9). In the case where the difference ΔP_ACV does not exceed the threshold (S8: NO), the controller 12 executes the processing of S4.

As described above, in this embodiment, by monitoring changes in the voltage P_ACV of the passive electrode 14 over time, it is determined whether a metal foreign object 50 has become interposed between the active electrodes 13 and 23 and touched by a user. Therefore, a problem such as a user experiencing an electric shock upon touching the metal foreign object 50 can be prevented.

REFERENCE SIGNS LIST

1 . . . wireless power transmission system
10 . . . DC-AC inverter circuit
11 . . . driver
12 . . . controller
13 . . . active electrode
13, 23 . . . active electrode
14, 24 . . . passive electrode
15 . . . A_ACV detection circuit
16 . . . P_ACV detection circuit
20 . . . DC-DC converter
50 . . . metal foreign object
101 . . . power transmission device
121 . . . ACV detection unit
122 . . . difference calculation unit
123 . . . foreign object determination unit
124 . . . power transmission stopping unit
201 . . . power reception device
C11, C12, C21, C22, C3 . . . capacitor
C41, C42, C43, C44 . . . capacitor
C51 . . . capacitance
C52 . . . capacitor
D1, D2, D3, D4 . . . diode
D11, D12 . . . diode
IN1, IN2 . . . input terminal
OUT1, OUT2 . . . output terminal
P . . . connection point
Q1, Q2, Q3, Q4 . . . switch element
R11, R12, R13 . . . resistor
R51 . . . resistance component
T1 . . . step-up transformer
T2 . . . step-down transformer
Vin . . . direct-current voltage

The invention claimed is:

1. A power transmission device for transmitting power via electric field coupling to a power reception device having a pair of power reception electrodes, the power transmission device comprising:
    first and second power transmission electrodes that respectively oppose the pair of power reception electrodes with a gap therebetween, when the power reception device is positioned adjacent to the power transmission device;
    a voltage detection circuit configured to monitor a voltage of one of the first and second power transmission electrode; and
    a control circuit configured to determine an absolute value of a change per a time interval in the monitored voltage and to stop power transmission to the power reception device when the absolute value exceeds a predetermined threshold,
    wherein the control circuit determines the absolute value by:
        detecting an initial voltage of the one of the first and second power transmission;
        detecting a subsequent voltage of the one of the first and second power transmission electrode after the time interval; and
        determining the absolute value by calculating a difference between the initial voltage and the subsequent voltage.

2. The power transmission device according to claim 1, wherein the second power transmission electrode comprises a surface area equal to or greater than a surface area of the first power transmission electrode.

3. The power transmission device according to claim 1, wherein the voltage detection circuit comprises:
    a pair of capacitors forming a voltage divider and coupled the one of the first and second power transmission electrode and a ground connection;
    a first resistor coupled between a node between the pair of capacitors and the ground connection; and
    a first diode coupled between the node between the pair of capacitors and the control circuit.

4. The power transmission device according to claim 3, wherein the voltage detection circuit further comprises:
a second diode coupled between the ground connection and an input of the first diode;
another capacitor coupled between the ground connection and an output of the first diode; and
a pair of voltage control resistors coupled to the output of the first diode and the control circuit.

5. The power transmission device according to claim 1, further comprising a plurality of switching elements configured to apply a voltage received from voltage input to the first and second power transmission electrodes to transmit power to the power reception device.

6. The power transmission device according to claim 5, further comprising a driver coupled between the control circuit and the plurality of switching elements, wherein the control circuit causes the driver to turn off the plurality of switching elements when the absolute value exceeds a predetermined threshold.

7. A power transmission device for transmitting power via electric field coupling to a power reception device having a pair of power reception electrodes, the power transmission device comprising:
first and second power transmission electrodes that respectively oppose the pair of power reception electrodes with a gap therebetween, when the power reception device is positioned adjacent to the power transmission device;
a voltage detection circuit configured to monitor a voltage of one of the first and second power transmission electrode; and
a control circuit configured to determine an absolute value of a change per a time interval in the monitored voltage and to stop power transmission to the power reception device when the absolute value exceeds a predetermined threshold,
wherein the control circuit comprises a microcomputer including a computer program that, when executed by the microprocessor, causes the microprocessor to determine the absolute value, compare the absolute value with the predetermined threshold, and stop power transmission by the power transmission device to the power reception device when the absolute value exceeds the predetermined threshold.

8. A wireless power transmission system comprising:
a power reception device including a pair of power reception electrodes, and a voltage supply circuit configured to supply a voltage induced in the pair of power reception electrodes to a load; and
a power transmission device including:
first and second power transmission electrodes that respectively oppose the pair of power reception electrodes with a gap therebetween, when the power reception device is positioned adjacent to the power transmission device;
a voltage detection circuit configured to monitor a voltage of one of the first and second power transmission electrode; and
a control circuit configured to determine an absolute value of a change per a time interval in the monitored voltage and to stop power transmission to the power reception device when the absolute value exceeds a predetermined threshold
wherein the control circuit of the power transmission device comprises a microcomputer including a computer program that, when executed by the microprocessor, causes the microprocessor to determine the absolute value, compare the absolute value with the predetermined threshold, and stop power transmission by the power transmission device to the power reception device when the absolute value exceeds the predetermined threshold.

9. The wireless power transmission system according to claim 8, wherein the second power transmission electrode of the power transmission device comprises a surface area equal to or greater than a surface area of the first power transmission electrode.

10. The wireless power transmission system according to claim 8, wherein the voltage detection circuit of the power transmission device comprises:
a pair of capacitors forming a voltage divider and coupled the one of the first and second power transmission electrode and a ground connection;
a first resistor coupled between a node between the pair of capacitors and the ground connection; and
a first diode coupled between the node between the pair of capacitors and the control circuit.

11. The wireless power transmission system according to claim 10, wherein the voltage detection circuit of the power transmission device comprises:
a second diode coupled between the ground connection and an input of the first diode;
another capacitor coupled between the ground connection and an output of the first diode; and
a pair of voltage control resistors coupled to the output of the first diode and the control circuit.

12. The wireless power transmission system according to claim 8, wherein the power transmission device further comprises a plurality of switching elements configured to apply a voltage received from voltage input to the first and second power transmission electrodes to transmit power to the power reception device.

13. The wireless power transmission system according to claim 12, wherein the power transmission device further comprises a driver coupled between the control circuit and the plurality of switching elements, wherein the control circuit causes the driver to turn off the plurality of switching elements when the absolute value exceeds a predetermined threshold.

14. A method for transmitting power via electric field coupling from a power transmitting device having a pair of power transmitting electrodes to a power reception device having a pair of power reception electrodes, the method comprising:
initiating wireless power transmission from the power transmitting device to the power reception device via electric field coupling between the pair of power transmission electrodes and the power reception electrodes when the power reception device is positioned adjacent to the power transmission device;
detecting an initial voltage of the one of the first and second power transmission electrode after initiating the wireless power transmission;
monitoring a voltage of one of the first and second power transmission electrode when the power reception device is positioned adjacent to the power transmission device;
detecting a subsequent voltage of the one of the first and second power transmission electrode after a time interval;
determining an absolute value of a change per the time interval in the monitored voltage by calculating a difference between the initial voltage and the subsequent voltage;

comparing the absolute value to a predetermined threshold; and stopping power transmission to the power reception device when the absolute value exceeds the predetermined threshold.

\* \* \* \* \*